United States Patent
Nishimura

(10) Patent No.: US 10,836,111 B2
(45) Date of Patent: Nov. 17, 2020

(54) METHOD FOR MANUFACTURING REINFORCING FIBER BASE MATERIAL, AND REINFORCING FIBER BASE MATERIAL

(71) Applicant: TSUDAKOMA KOGYO KABUSHIKI KAISHA, Kanazawa (JP)

(72) Inventor: Isao Nishimura, Kanazawa (JP)

(73) Assignee: TSUDAKOMA KOGYO KABUSHIKI KAISHA, Kanazawa (JP)

( * ) Notice: Subject to any disclaimer, the term of this patent is extended or adjusted under 35 U.S.C. 154(b) by 0 days.

(21) Appl. No.: 15/592,246

(22) Filed: May 11, 2017

(65) Prior Publication Data

US 2017/0326809 A1  Nov. 16, 2017

(30) Foreign Application Priority Data

May 13, 2016  (JP) .................................. 2016-097023

(51) Int. Cl.
  *B29C 65/02* (2006.01)
  *B29C 65/00* (2006.01)
  (Continued)

(52) U.S. Cl.
  CPC .......... *B29C 65/02* (2013.01); *B29C 66/1142* (2013.01); *B29C 70/202* (2013.01);
  (Continued)

(58) Field of Classification Search
  CPC .......... B29C 70/202; B29C 2793/0072; B29C 2793/0081; B29C 65/02; B29C 66/1142;
  (Continued)

(56) References Cited

U.S. PATENT DOCUMENTS 5,824,178 A  10/1998 Shingu et al.
2010/0075126 A1  3/2010 Ford et al.
(Continued)

FOREIGN PATENT DOCUMENTS

EP  0740996 A1  11/1996
EP  2431160 A1  3/2012
(Continued)

OTHER PUBLICATIONS

European Search Report dated Oct. 9, 2017, 1 page.

*Primary Examiner* — Camie S Thompson
(74) *Attorney, Agent, or Firm* — Rankin, Hill & Clark LLP

(57) ABSTRACT

A method for manufacturing a reinforcing fiber base material includes a placement step of placing a sheet-shaped reinforcing fiber material piece, in which reinforcing fibers are arranged so as to extend in one direction and bound together with a thermoplastic resin, on a table so that the orientation direction of the reinforcing fibers is at an angle with respect to a longitudinal direction of the reinforcing fiber base material, and a welding step in which, in a state in which a previously placed reinforcing fiber material piece and the reinforcing fiber material piece placed subsequent thereto are abutted against each other in the longitudinal direction, adjoining edges of the two reinforcing fiber material pieces are welded together to form a continuous sheet shape.

1 Claim, 5 Drawing Sheets

(51) Int. Cl.
*B29C 70/22* (2006.01)
*B29C 70/50* (2006.01)
*B29C 70/20* (2006.01)
*B29K 105/06* (2006.01)
*B29L 7/00* (2006.01)
*B29K 307/04* (2006.01)

(52) U.S. Cl.
CPC ............ *B29C 70/228* (2013.01); *B29C 70/50* (2013.01); *B29C 2793/0072* (2013.01); *B29C 2793/0081* (2013.01); *B29K 2105/06* (2013.01); *B29K 2307/04* (2013.01); *B29L 2007/002* (2013.01)

(58) Field of Classification Search
CPC ....... B29C 70/228; B29C 70/50; B29C 66/71; B29C 66/721; B29C 66/72143; B29C 66/7392; B29C 65/7894; B29C 70/02; B32B 2305/10; Y10T 156/1077; Y10T 156/1079; Y10T 156/1084; Y10T 156/1098; Y10T 156/179; B29K 2105/06; B29L 2007/002
USPC ........ 156/266.269, 303, 361, 519, 265, 266, 156/269, 177, 178; 428/297.4
See application file for complete search history.

(56) References Cited

U.S. PATENT DOCUMENTS

2013/0177735 A1   7/2013   Szukat et al.
2014/0299260 A1   10/2014  Bonse et al.

FOREIGN PATENT DOCUMENTS

| | | |
|---|---|---|
| EP | 2783839 A2 | 10/2014 |
| JP | H07-227841 * | 8/1995 |
| JP | 2011-021926 | 2/2011 |
| WO | 2014/084119 A1 | 6/2014 |

\* cited by examiner

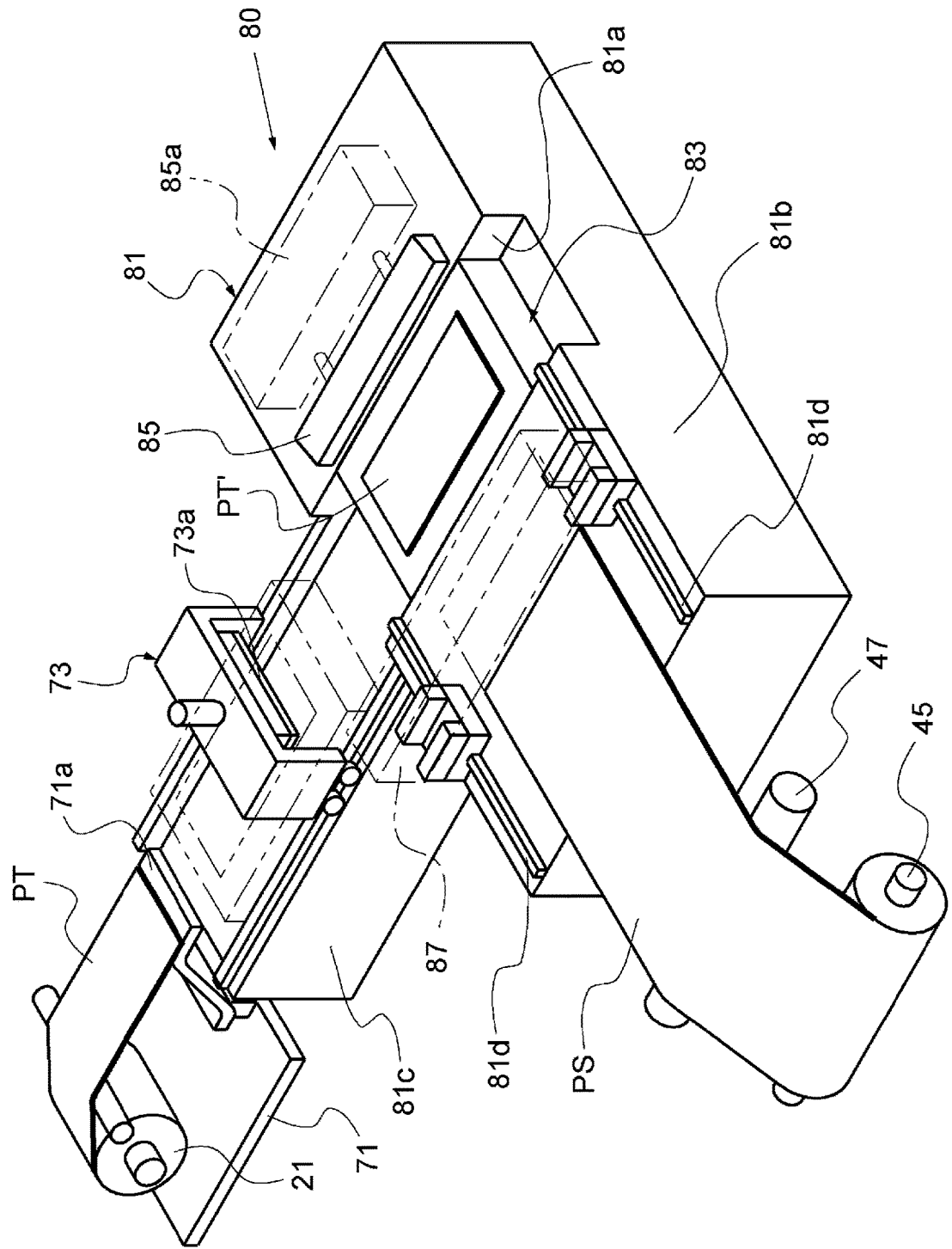

METHOD FOR MANUFACTURING REINFORCING FIBER BASE MATERIAL, AND REINFORCING FIBER BASE MATERIAL

BACKGROUND OF THE INVENTION

1. Field of the Invention

The present invention relates to a thermoplastic reinforcing fiber base material having the shape of a continuous elongated sheet and used to form a fiber reinforced composite material.

2. Description of the Related Art

A fiber reinforced composite material, such as carbon fiber reinforced plastic (CFRP), has a multilayer structure obtained by laying up a plurality of layers of reinforcing fiber base material (for example, prepreg formed by impregnating reinforcing fibers (carbon fibers or the like) with a matrix resin). The matrix resin may be a thermosetting resin or a thermoplastic resin. It is known that the formability of the reinforcing fiber base material is higher when a thermoplastic resin is used as the matrix resin than when a thermosetting resin is used.

The reinforcing fiber base material may be a woven material obtained by impregnating a woven fabric, formed by using reinforcing fibers as warp and weft yarns, with the matrix resin or a so-called UD material obtained by binding reinforcing fibers together by impregnating the reinforcing fibers with the matrix resin while the reinforcing fibers are arranged so as to extend in one direction. Instead of the above-described prepreg obtained by impregnating the woven cloth or the reinforcing fibers arranged so as to extend in one direction with the matrix resin, the reinforcing fiber base material may be so-called semi-preg, which is obtained by applying a sufficient amount of matrix resin to keep the reinforcing fibers bound to the reinforcing fibers.

As described above, the fiber reinforced composite material has a multilayer structure including layers of the reinforcing fiber base material, and is formed by laying up the layers of the reinforcing fiber base material. In the lay-up process, for example, a roll body obtained by winding an elongated sheet-shaped reinforcing fiber base material, such as the above-described woven material or UD material, into a roll is prepared. The reinforcing fiber base material is pulled from the roll body and successively laid up to form a structure in which a plurality of reinforcing fiber base material pieces cut off from the roll body are laid up.

When the fiber reinforced composite material is formed, the reinforcing fiber base material pieces may be laid up so that the orientation direction of the reinforcing fibers differs between the reinforcing fiber base material pieces that form the layers. The fiber reinforced composite material formed in this way is known to have a higher rigidity and a higher strength compared to that formed by laying up the reinforcing fiber base material pieces so that the reinforcing fibers have the same orientation direction.

Accordingly, when the fiber reinforced composite material in which the orientation direction of the reinforcing fibers differs for each layer is to be formed by using the above-described UD material as the reinforcing fiber base material, the lay-up process is performed by laying up the reinforcing fiber base material while changing the direction in which the reinforcing fiber base material is pulled from the roll body for each layer. In other words, the lay-up process includes a step of changing the direction in which the reinforcing fiber base material is pulled for each layer.

Here, Japanese Unexamined Patent Application Publication No. 2011-219269 (hereinafter referred to as Patent Document 1) discloses a method for preparing an elongated sheet-shaped reinforcing fiber base material (prepreg sheet material) in the form of a roll body as described above. The reinforcing fiber base material is prepared as a bias ply material (angle layer material) in which the orientation direction of the reinforcing fibers is at an angle with respect to the longitudinal direction of the reinforcing fiber base material (direction in which the reinforcing fiber base material is pulled from the roll body). More specifically, according to the method disclosed in Patent Document 1, a reinforcing fiber material formed by impregnating reinforcing fibers arranged so as to extend in one direction with a matrix resin is laid up on a base material, which is a sheet-shaped support member (a sheet material made of polyethylene film, paper, or the like). The reinforcing fiber material is successively laid up on the base material in parallel at different positions in the longitudinal direction of the support member while being at an angle with respect to the longitudinal direction. Thus, an angle layer material (reinforcing fiber base material) in which the orientation direction of the reinforcing fibers is at an angle as described above is manufactured. Patent Document 1 also discloses that the matrix resin used to form the UD material is a resin that can be melted by heat (thermoplastic resin).

The reinforcing fiber base material in which the orientation direction of the reinforcing fibers is at an angle as described above can be manufactured in the above-described manner. When a plurality of types of reinforcing fiber base materials, such as the above-described UD materials, in which the reinforcing fibers are oriented in different directions with respect to the longitudinal direction thereof are prepared, the reinforcing fiber base materials can be laid up to form a fiber reinforced composite material in which the orientation direction of the reinforcing fibers differs for each layer without changing the direction in which the reinforcing fiber base materials are pulled from the respective roll bodies.

Unfortunately, Patent Document 1 discloses only a method for manufacturing a reinforcing fiber base material as an angle layer material in the form of a sheet in which the reinforcing fiber material is laid up on and bonded to the support member, as described above. Therefore, the fiber reinforced composite material formed by laying up the reinforcing fiber material includes layers of the above-described support member. No method for manufacturing a reinforcing fiber base material as an angle layer material including only a layer of reinforcing fiber material has yet been proposed.

SUMMARY OF THE INVENTION

Accordingly, the present invention relates to the manufacture of a reinforcing fiber base material, and proposes a method for manufacturing a reinforcing fiber base material as a new angle layer material including only a layer of reinforcing fiber material (formed only of a single layer of reinforcing fiber material), and the reinforcing fiber material.

A method for manufacturing a reinforcing fiber base material according to the present invention is a method for manufacturing a reinforcing fiber base material having a shape of a continuous elongated sheet and used to manufacture a fiber reinforced composite material, the reinforcing fiber base material including reinforcing fibers oriented in a same orientation direction and a thermoplastic resin and being formed so that the orientation direction of the reinforcing fibers is at an angle with respect to a longitudinal direction of the reinforcing fiber base material.

The method includes a placement step and a welding step. The placement step is a step of placing a sheet-shaped reinforcing fiber material piece, in which the reinforcing fibers are arranged so as to extend in one direction and bound together with the thermoplastic resin, on a table so that the orientation direction of the reinforcing fibers is at an angle with respect to the longitudinal direction of the reinforcing fiber base material. The reinforcing fiber material piece is placed behind the previous reinforcing fiber material piece, which has been placed previous thereto, in a feeding direction of the reinforcing fiber base material on the table. The feeding direction being parallel to the longitudinal direction. In the welding step, in a state in which the previous reinforcing fiber material piece and the subsequent reinforcing fiber material piece placed subsequent thereto are abutted against each other in the longitudinal direction, adjoining edges of the previous reinforcing fiber material piece and the subsequent reinforcing fiber material piece are welded together to form a continuous sheet shape.

A reinforcing fiber base material according to the present invention has a shape of a continuous elongated sheet and is used to manufacture a fiber reinforced composite material. In the reinforcing fiber base material, sheet-shaped reinforcing fiber material pieces, in each of which reinforcing fibers are arranged so as to extend in one direction and bound together with a thermoplastic resin, are arranged in a longitudinal direction of the reinforcing fiber base material in such a state that the orientation direction of the reinforcing fibers differ from the longitudinal direction, and adjoining edges of the reinforcing fiber material pieces that adjoin each other in the longitudinal direction are welded and integrated together so that the reinforcing fiber base material is formed in a continuous sheet shape.

According to the method of the present invention for manufacturing a reinforcing fiber base material as the above-described angle layer material, a reinforcing fiber base material including only a reinforcing fiber material can be manufactured without using a support member, such as a film, and without performing a lay-up process as in the manufacturing method according to the above-described Patent Document 1.

BRIEF DESCRIPTION OF THE DRAWINGS

FIG. 4 is a perspective view of another example of a machine for implementing the manufacturing method according to the present invention.

DESCRIPTION OF THE PREFERRED EMBODIMENTS

An embodiment (example) of a method for manufacturing a reinforcing fiber base material according to the present invention will now be described. In the example described below, the present invention is implemented by a machine based on an automatic lay-up machine illustrated in, for example, FIG. 1. In the example described below, reinforcing fiber material pieces used to manufacture the reinforcing fiber base material are narrow sheet-shaped material pieces formed of thermoplastic UD prepreg obtained by impregnating carbon fibers, which serve as reinforcing fibers, arranged so as to extend in one direction with a thermoplastic resin (for example, polyamide-based resin, polypropylene-based resin, acrylic resin, or ABS resin). The reinforcing fiber base material according to the present invention has the shape of an elongated sheet. In this example, the reinforcing fiber base material is formed so that the orientation direction of the reinforcing fibers (carbon fibers) is at an angle with respect to the longitudinal direction of the reinforcing fiber base material and a width direction of the reinforcing fiber base material that is perpendicular to the longitudinal direction and the horizontal direction.

The machine illustrated in FIGS. 1 to 3 (hereinafter referred to as base-material forming machine) is based on an automatic lay-up machine and used to implement the method for manufacturing a reinforcing fiber base material according to the present invention in this example. The structure of the base-material forming machine is basically similar to that of the automatic lay-up machine disclosed in Japanese Unexamined Patent Application Publication No. 2015-217540 except for the part related to the present invention and a portion of a supply head (head device).

Figure 1:
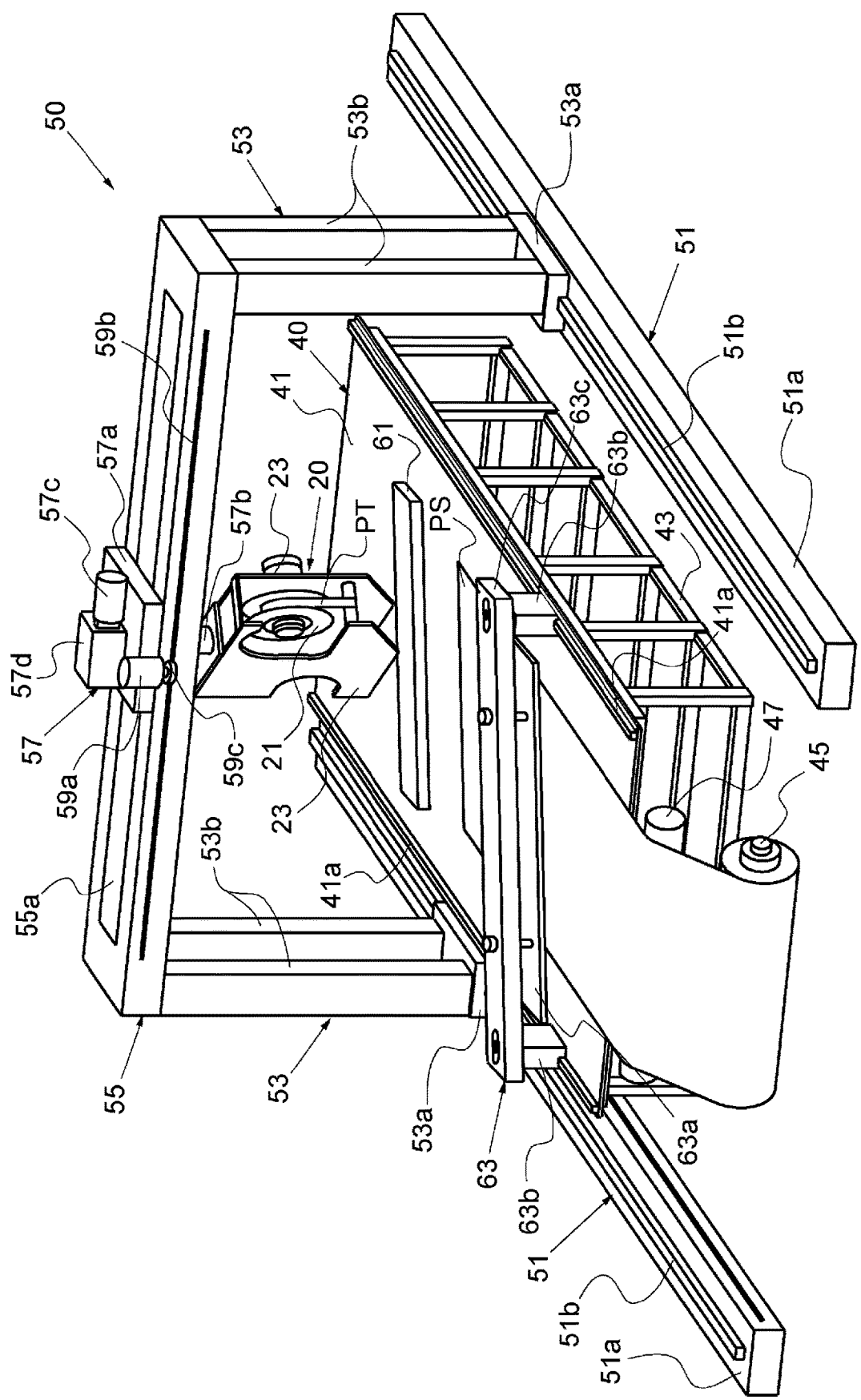
FIG. 1 is a perspective view of an example of a machine for implementing a manufacturing method according to the present invention.

As illustrated in FIG. 1, the base-material forming machine includes a supply head 20, a table 40, and a support mechanism 50. A raw-material roller 21 for a reinforcing fiber material, from which the reinforcing fiber material pieces are obtained, is mounted in the supply head 20. The reinforcing fiber material pieces are successively placed on the table 40 to form a sheet-shaped reinforcing fiber base material. The support mechanism 50 is a double-housing mechanism on which the supply head 20 is supported (suspended). The support mechanism 50 moves the supply head 20 above the table 40 to place the reinforcing fiber material pieces on the top surface of the table 40. The base-material forming machine also includes a take-up mechanism that takes up the reinforcing fiber base material that has been formed in the shape of a sheet on the table 40.

Each of the above-described components will now be described. The table 40 includes a top plate 41 having a rectangular shape in plan view, and a support base 43 that supports the top plate 41. The top surface of the top plate 41 of the table 40 serves as a placement surface on which the reinforcing fiber material pieces are placed.

The support mechanism 50 has a double-housing structure as described above, and includes a gantry unit and a saddle unit 57. The gantry unit includes a pair of side rails 51, a pair of columns 53 provided so as to correspond to the respective side rails 51, and a crossbeam 55 that extends between the columns 53. The saddle unit 57 is provided on the crossbeam 55 of the gantry unit and supports the supply head 20.

In the support mechanism 50, the side rails 51 of the gantry unit form a base of the support mechanism 50, and include elongated rectangular columnar base portions 51a as main bodies thereof. The side rails 51 are placed on the floor at both sides of the table 40 in the short-side direction of the top plate 41 so that the longitudinal direction thereof is parallel to the long-side direction of the top plate 41 of the table 40. A guide rail 51b is provided on the top surface of the base portion 51a of each side rail 51. The guide rail 51b guides the movement of the corresponding column 53 in the longitudinal direction. As described above, the long-side direction of the table 40 (top plate 41) and the longitudinal direction of the side rails 51 are the same, and these directions coincide with the front-rear direction of the base-material forming machine. In the following description, these directions and directions parallel thereto are generically referred to as the "front-rear direction".

Each column 53 includes a mount portion 53a and a pair of pillars 53b that stands on the mount portion 53a. The mount portion 53a of each column 53 is mounted on the base portion 51a of the corresponding side rail 51, and is guided by the guide rail 51b of the side rail 51 to enable the column 53 to move in the front-rear direction of the side rail 51. The crossbeam 55 is an elongated rectangular columnar beam member, and extends between the columns 53 so that both ends thereof are attached to the top ends of each of the pillars 53b of the columns 53. When the crossbeam 55 is disposed in the above-described manner, the columns 53 are at the same position in the front-rear direction of the side rails 51. Thus, the crossbeam 55 is arranged so that the longitudinal direction thereof coincides with the direction perpendicular to the front-rear direction of the side rails 51 (short-side direction of the table 40 (top plate 41)).

In the gantry unit including the above-described beam structure, a driving mechanism including, for example, a rack, a pinion gear, and a driving motor (none of them are illustrated) is provided between each side rail 51 and the corresponding column 53. More specifically, the gantry unit is configured so that the columns 53 and the crossbeam 55 that extends between the columns 53 can be driven by the driving mechanisms so as to move in the front-rear direction of the side rails 51. As described above, the long-side direction of the crossbeam 55 and the short-side direction of the table 40 (top plate 41) are the same, and these directions coincide with the width direction of the base-material forming machine. Accordingly, these directions and directions parallel thereto are generically referred to as the "width direction".

The saddle unit 57 is a mechanism for allowing the supply head 20 to be supported by the support mechanism 50, and is provided on the crossbeam 55 of the gantry unit structured as described above. The saddle unit 57 includes a plate-shaped saddle base 57a, which is movable in the width direction on the crossbeam 55, as a main body. The saddle unit 57 also includes a support shaft 57b that is rotatably supported by the saddle base 57a in such a manner that the support shaft 57b projects downward from a surface of the saddle base 57a that faces the crossbeam 55. The crossbeam 55 of the gantry unit has a hole 55a that extends through the crossbeam 55 in the top-bottom direction and that is elongated in the width direction. The hole 55a receives the support shaft 57b and enables the saddle unit 57 to be moved in the width direction. The support shaft 57b of the saddle unit 57 extends downward through the hole 55a to a region below the crossbeam 55.

The saddle unit 57 includes a head driving mechanism provided on the saddle base 57a. The head driving mechanism is configured to rotate the support shaft 57b, and includes a driving motor 57c and a driving-force transmission mechanism 57d that couples the driving motor 57c to the support shaft 57b and transmits the rotation of the output shaft of the driving motor 57c to the support shaft 57b. Accordingly, the support shaft 57b of the saddle unit 57 is rotatable around the axis thereof that extends in the vertical direction by the head driving mechanism.

The support mechanism 50 includes a driving mechanism provided between the saddle unit 57 and the crossbeam 55. The driving mechanism moves the saddle unit 57 in the width direction. An example of the driving mechanism is illustrated. This driving mechanism includes a driving motor 59a attached to a side surface of the saddle base 57a of the saddle unit 57 so that the axis of the output shaft of the driving motor 59a extends in the vertical direction, a rack 59b attached to a side surface of the crossbeam 55, and a pinion gear 59c that is attached to the output shaft of the driving motor 59a and meshes with the rack 59b. Thus, the support mechanism 50 is structured such that the saddle unit 57 can be driven by the driving mechanism so as to move in the width direction on the crossbeam 55.

The supply head 20, which supplies the reinforcing fiber material, is attached to the support shaft 57b of the saddle unit 57 included in the support mechanism 50 having the above-described structure, thereby being suspended from the crossbeam 55 of the support mechanism 50. In the support mechanism 50, the columns 53 are driven so as to move in the front-rear direction on the side rails 51, and/or the saddle unit 57 is driven so as to move in the width direction on the crossbeam 55, so that the supply head 20 move in the front-rear direction, in the width direction, or in a direction that crosses the front-rear and width directions above the table 40.

The supply head 20 includes a support frame including a pair of support plates 23 as a main body, and supports the raw-material roller 21 in the region between the support plates 23. The raw-material roller 21 is obtained by winding an elongated tape-shaped reinforcing fiber material around a reel (spool). In this example, the reinforcing fiber material of the raw-material roller 21 is a material obtained by forming thermoplastic UD prepreg, containing carbon fibers as the reinforcing fibers, in the form of a narrow tape (hereinafter referred to as "prepreg tape PT").

In the base-material forming machine, the prepreg tape PT is pulled from the raw-material roller 21 mounted in the supply head 20, and prepreg tape pieces PT', which are reinforcing fiber material pieces cut off from the prepreg tape PT, are successively placed on the table 40 (top plate 41). Accordingly, the supply head 20 includes mechanisms for placing each prepreg tape piece PT' on the table 40 inside the support frame (in the region between the support plates 23).

Figure 2A:
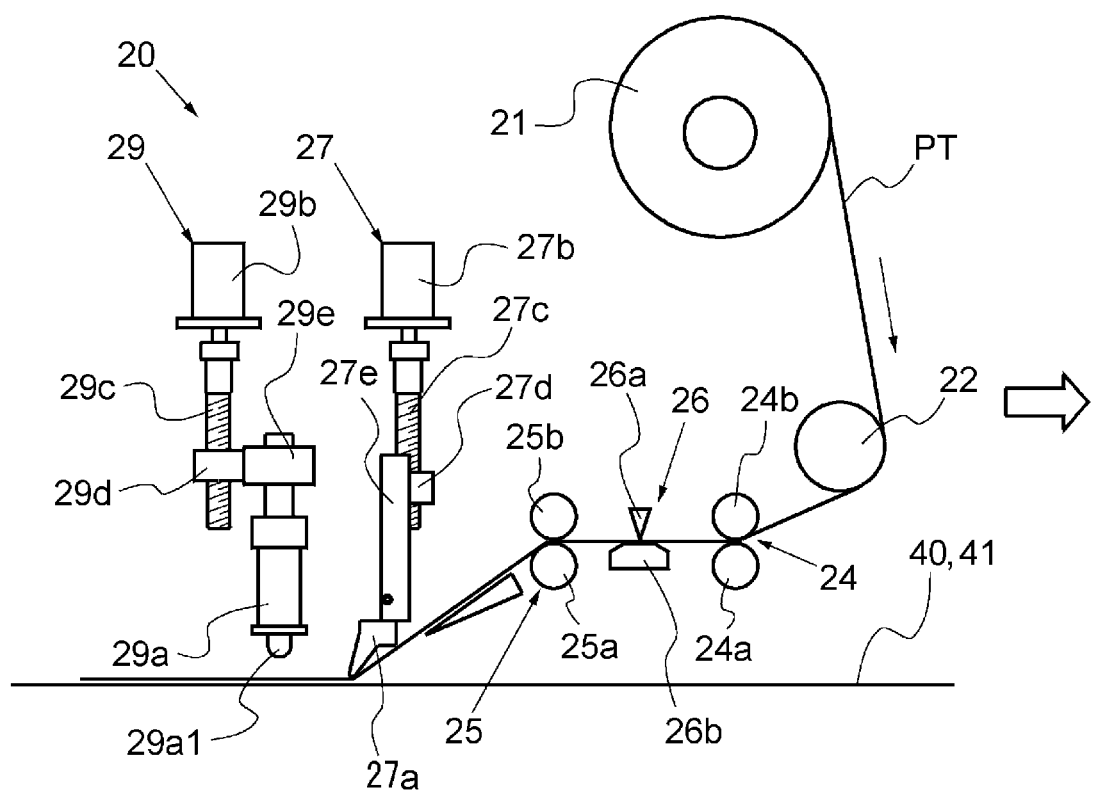
FIGS. 2A and 2B are schematic diagrams illustrating the structure of a mechanism included in the machine illustrated in FIG. 1 for describing the operation of the mechanism.
Figure 2B:
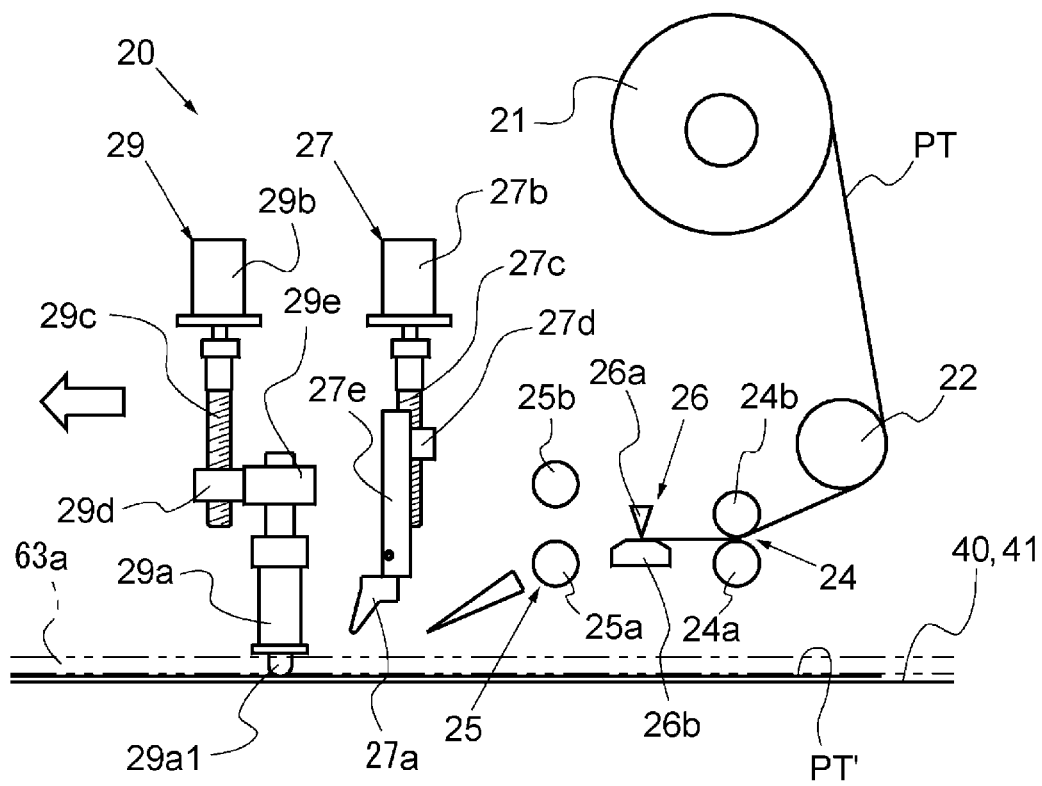

FIGS. 2A and 2B are schematic diagrams illustrating the structure inside the support frame of the supply head 20. As illustrated in FIGS. 2A and 2B, in the supply head 20, the prepreg tape PT pulled from the raw-material roller 21 is wound around a guide roller 22 and redirected, and is fed toward a placement mechanism 27 that places the prepreg tape PT on the table 40. In the supply head 20, two nip roller pairs 24 and 25, each of which is a pair of rollers, are disposed between the guide roller 22 and the placement mechanism 27.

The nip roller pairs 24 and 25 respectively include driving rollers 24a and 25a that are rotated at a predetermined rotational speed by a driving mechanism (not illustrated) and driven rollers 24b and 25b that are capable of coming into contact with and moving away from the driving rollers 24a and 25a. The driven rollers 24b and 25b are rotated by being pressed against the driving rollers 24a and 25a when the prepreg tape PT is being placed on the table 40. The prepreg tape PT that has passed the guide roller 22 is guided while being nipped by the nip roller pairs 24 and 25, and is fed toward the placement mechanism 27 in accordance with the rotation of the driving rollers 24a and 25a of the nip roller pairs 24 and 25.

The supply head 20 also includes a cutting device 26 for cutting off the prepreg tape piece PT' from the prepreg tape PT so that the prepreg tape piece PT' having a predetermined length is placed on the table 40. The cutting device 26 is disposed between the nip roller pairs 24 and 25, and includes a cutter 26a that cuts the prepreg tape PT and a receiving pad 26b that faces the cutter 26a in the top-bottom direction. The receiving pad 26b is disposed so that the top surface thereof, which serves as a receiving surface, is at substantially the same position as the path of the prepreg tape PT between the nip roller pairs 24 and 25 in the top-bottom direction.

The cutting device 26 also includes a driving mechanism (not illustrated) for moving the cutter 26a between a retracted position at which the cutter 26a is separated from the receiving pad 26b and a cutting position at which the edge of the cutter 26a is in contact with the receiving surface of the receiving pad 26b. The prepreg tape PT is cut by moving the cutter 26a toward the receiving surface 26b while the prepreg tape PT extends between the nip roller pairs 24 and 25 (while the prepreg tape PT is nipped by the nip roller pairs 24 and 25).

The placement mechanism 27 is a mechanism for placing the prepreg tape PT fed from the nip roller pair 25 on the table 40 (top plate 41), and includes a placement guide 27a for pressing the prepreg tape PT from above and placing the prepreg tape PT on the table 40 at a desired position. The placement mechanism 27 is structured such that the placement guide 27a is supported by a ball screw mechanism and is driven so as to move in the top-bottom direction.

More specifically, the placement mechanism 27 includes a ball screw mechanism including a driving motor 27b, a screw shaft 27c coupled with the output shaft of the driving motor 27b, and a nut 27d screwed on the screw shaft 27c. The placement guide 27a is supported by the nut 27d of the ball screw mechanism with a bracket 27e provided therebetween. The placement mechanism 27 also includes a guide (not illustrated) that prevents the nut 27d and the bracket 27e from rotating together with the screw shaft 27c and guides the movement of the bracket 27e and the placement guide 27a in the top-bottom direction. Thus, the placement mechanism 27 is structured such that the driving motor 27b rotates the screw shaft 27c to move the nut 27d and the bracket 27e upward or downward depending on the rotation direction of the screw shaft 27c, thereby moving the placement guide 27a in the top-bottom direction.

The driving motor 27b of the placement mechanism 27 is controlled so that the placement guide 27a moves in the top-bottom direction between two positions: an operation position, at which the placement guide 27a is located when the prepreg tape PT is placed on the table 40 and which is close to the above-described placement surface of the table 40, and a retracted position, at which the placement guide 27a is spaced from and above the placement surface of the table 40.

With the above-described structure, as described above, the columns 53 and/or the saddle unit 57 of the support mechanism 50 move in the above-described manner to move the supply head 20 above the table 40. The supply head 20 feeds the prepreg tape PT from the nip roller pair 25 of the supply head 20 toward the placement mechanism 27 by an amount corresponding to the amount of movement thereof. Also, the placement guide 27a of the placement mechanism 27 is moved downward to the operation position so that the prepreg tape PT fed from the nip roller pair 25 is pressed against the table 40 by the placement guide 27a (FIG. 2A). Accordingly, as the supply head 20 moves, the prepreg tape PT is placed on the table 40 along the movement path of the supply head 20.

Then, in the supply head 20, when a predetermined length of prepreg tape PT is pulled from the raw-material roller 21, the rotation of the driving roller 24a included in the nip roller pair 24 located upstream of the cutting device 26 (closer to the raw-material roller 21 along the path of the prepreg tape PT) is stopped, and the prepreg tape PT is cut by the cutting device 26 at a location between the nip rollers 24 and 25. Accordingly, feeding of the prepreg tape PT is stopped in the region upstream of the cutting position so that the prepreg tape PT is not pulled from the raw-material roller 21. A portion of the prepreg tape PT closer to the leading end than the cutting position (prepreg tape piece PT') is fed toward the placement mechanism 27 by the downstream nip roller pair 25. As a result, the prepreg tape piece PT' having a predetermined length is placed on the table 40 in the same direction as the direction in which the supply head 20 is moved. Thus, the base-material forming machine caries out a placement step for the prepreg tape piece PT' in accordance with the movement of the supply head 20.

In the above-described base-material forming machine, the prepreg tape piece PT' is placed next to behind the previous prepreg tape piece PT' that has been placed previous thereto in the front-rear direction while being aligned with the previous prepreg tape piece PT' in the width direction. The prepreg tape pieces PT' that have been successively placed on the table 40 are joined together on the table 40, so that an elongated sheet-shaped reinforcing fiber base material (hereinafter referred to as a "prepreg sheet PS") formed of the prepreg tape pieces PT' is obtained. Accordingly, the longitudinal direction of the prepreg sheet PS coincides with the above-described front-rear direction, and the width direction of the prepreg sheet PS coincides with the above-described width direction. Here, the term "behind" in the front-rear direction used herein means toward the rear (opposite to the front) in the feeding direction of the reinforcing fiber base material (prepreg sheet PS) when the side at which the take-up mechanism, which will be described below, is disposed is defined as the front.

The previous prepreg tape piece PT' is already integrated with the prepreg sheet PS when the subsequent prepreg tape piece PT' is subsequently placed behind the previous prepreg tape piece PT'. Therefore, in practice, the subsequent prepreg tape piece PT' is placed behind the prepreg sheet PS. However, since the previous prepreg tape piece PT' that has been placed previous to the subsequent prepreg tape piece PT' forms the rear end portion of the prepreg sheet PS, it can be assumed that the subsequent prepreg tape piece PT' is paced next to and behind the previous prepreg tape piece PT', as described above.

In this example, the prepreg sheet PS formed as the reinforcing fiber base material contains reinforcing fibers (carbon fibers) having an orientation direction that is at predetermined angles with respect to the longitudinal direction (front-rear direction) and the width direction, as described above. In the prepreg tape piece PT' that is placed in the above-described manner, the reinforcing fibers are oriented in the longitudinal direction of the prepreg tape piece PT'. Therefore, the above-described placement step is performed by moving the supply head 20 in a direction that is at the predetermined angles with respect to the front-rear direction and the width direction of the table 40. In the following description, the predetermined angles are represented by an angle with respect to the width direction, and the angle is 30°.

The movement of the supply head 20 in the placement step is realized by moving the columns 53 and the crossbeam 55 of the gantry unit rearward while moving the saddle unit 57, which supports the supply head 20, in the width direction on the crossbeam 55. While being moved, the supply head 20 is set to a state in which the support plates 23 are parallel to the movement direction of the supply head 20 and the raw-material roller 21 is disposed in front of the placement mechanism 27 in the movement direction. The supply head 20 is set to this state by rotating the support shaft 57b, which supports the supply head 20, with the head driving mechanism in the saddle unit 57 of the support mechanism 50.

The sheet-shaped prepreg sheet PS formed by successively placing the prepreg tape pieces PT' in the above-described manner is wound around a winding shaft 45 included in the take-up mechanism disposed in front of the table 40. The take-up mechanism is similar to a commonly known take-up mechanism, and detailed description thereof will be omitted. The take-up mechanism includes a support mechanism that supports the winding shaft 45 and a driving mechanism that rotates the winding shaft 45 supported by the support mechanism (neither is illustrated). The take-up mechanism also includes a guide roller 47 disposed between the table 40 and the winding shaft 45. The prepreg sheet PS formed on the table 40 is guided toward the winding shaft 45 via the guide roller 47, and is wound around the winding shaft 45. Thus, the prepreg sheet PS is transported toward the front on the table 40.

The base-material forming machine of this example also includes a positioning mechanism provided on the table 40 and a welding mechanism 29 mounted in the supply head 20 as structures for joining the prepreg tape piece PT' that is newly placed on the table 40 (subsequent prepreg tape piece PT') to the prepreg sheet PS that has already been formed. These structures will be described in detail.

The positioning mechanism is a mechanism for positioning the newly placed prepreg tape piece PT' so that the prepreg tape piece PT' adjoins the sheet-shaped prepreg sheet PS, formed of the previously placed prepreg tape pieces PT', without a gap therebetween in the front-rear direction. The positioning mechanism includes an abutting mechanism including a pressing plate 61 that brings the prepreg tape piece PT' into contact with an edge of the prepreg sheet PS at the rear side (side at the rear in the front-rear direction) (hereinafter referred to as "rear edge"), and a position maintaining mechanism 63 that maintains the position of the prepreg tape piece PT'.

The pressing plate 61 included in the abutting mechanism is a thin plate-shaped member having an elongated rectangular shape in plan view, and the dimension thereof in the long-side direction is greater than the dimension of the prepreg tape piece PT' in the longitudinal direction. The pressing plate 61 is disposed on the table 40 at a position separated from the rear edge of the prepreg sheet PS while the side surfaces thereof that extend in the long-side direction are parallel to the rear edge of the prepreg sheet PS. The abutting mechanism also includes a driving mechanism (not illustrated) that moves the pressing plate 61 along the table 40. The driving mechanism is configured to move the pressing plate 61 in a direction perpendicular to the rear edge of the prepreg sheet PS. Thus, in the abutting mechanism, the pressing plate 61 is driven so as to move toward and away from the rear edge of the prepreg sheet PS while the side surfaces thereof are parallel to the rear edge of the prepreg sheet PS.

In the abutting mechanism, the pressing plate 61 is driven so as to move toward the prepreg sheet PS after the prepreg tape piece PT' is placed along the rear edge of the prepreg sheet PS in the above-described placement step. Accordingly, the newly placed prepreg tape piece PT' is pushed by the pressing plate 61 and pressed against the rear edge of the prepreg sheet PS. As a result, the prepreg tape piece PT' is abutted against the rear edge of the prepreg sheet PS on the table 40 so as to adjoin the prepreg sheet PS without a gap therebetween. The amount by which the prepreg tape piece PT' is pushed by the pressing plate 61 (or the pressing force applied by the pressing plate 61) is set so that the prepreg tape piece PT' is not deformed (squashed) in the pushing direction.

The position maintaining mechanism 63 is a mechanism for maintaining the position of the prepreg tape piece PT' relative to the prepreg sheet PS after the prepreg tape piece PT' has been abutted against the prepreg sheet PS as described above. The position maintaining mechanism 63 includes a retaining plate 63a that presses the prepreg sheet PS and the prepreg tape piece PT' from above to maintain the position of the prepreg tape piece PT' as described above.

More specifically, the position maintaining mechanism 63 also includes a pair of leg blocks 63b and a support beam 63c that extends between the leg blocks 63b. The leg blocks 63b are disposed on the table 40 so as to be spaced from each other in the width direction and are movable in the front-rear direction. The retaining plate 63a is suspended from the support beam 63c. Guide rails 41a that extend in the front-rear direction are disposed on the table 40 at both sides in the width direction. Each leg block 63b is movable in the front-rear direction while being guided by the corresponding rail 41a, and is moved by a driving mechanism (not illustrated) in the front-rear direction.

The support beam 63c is located above the placement surface of the table 40 such that both end portions thereof are placed on the respective leg blocks 63b. The support beam 63c is rotatably connected to the leg blocks 63b by pivot pins or the like. The positions of the leg blocks 63b on the table 40 in the front-rear direction are set so that the support beam 63c is parallel to the prepreg tape piece PT' placed in the above-described manner in plan view, that is, so that the support beam 63c is at an angle of 30° with respect to the width direction.

The retaining plate 63a is disposed below the support beam 63c so that the retaining plate 63a is parallel to and overlaps with the support beam 63c in plan view. The retaining plate 63a is supported by the support beam 63c with driving means (for example, air cylinder, not described in detail) for moving the retaining plate 63a in the top-bottom direction provided therebetween. Therefore, the retaining plate 63a can be moved downward by the driving means to press the prepreg sheet PS and the prepreg tape piece PT' on the table 40, thereby maintaining the positions thereof.

Figure 3:
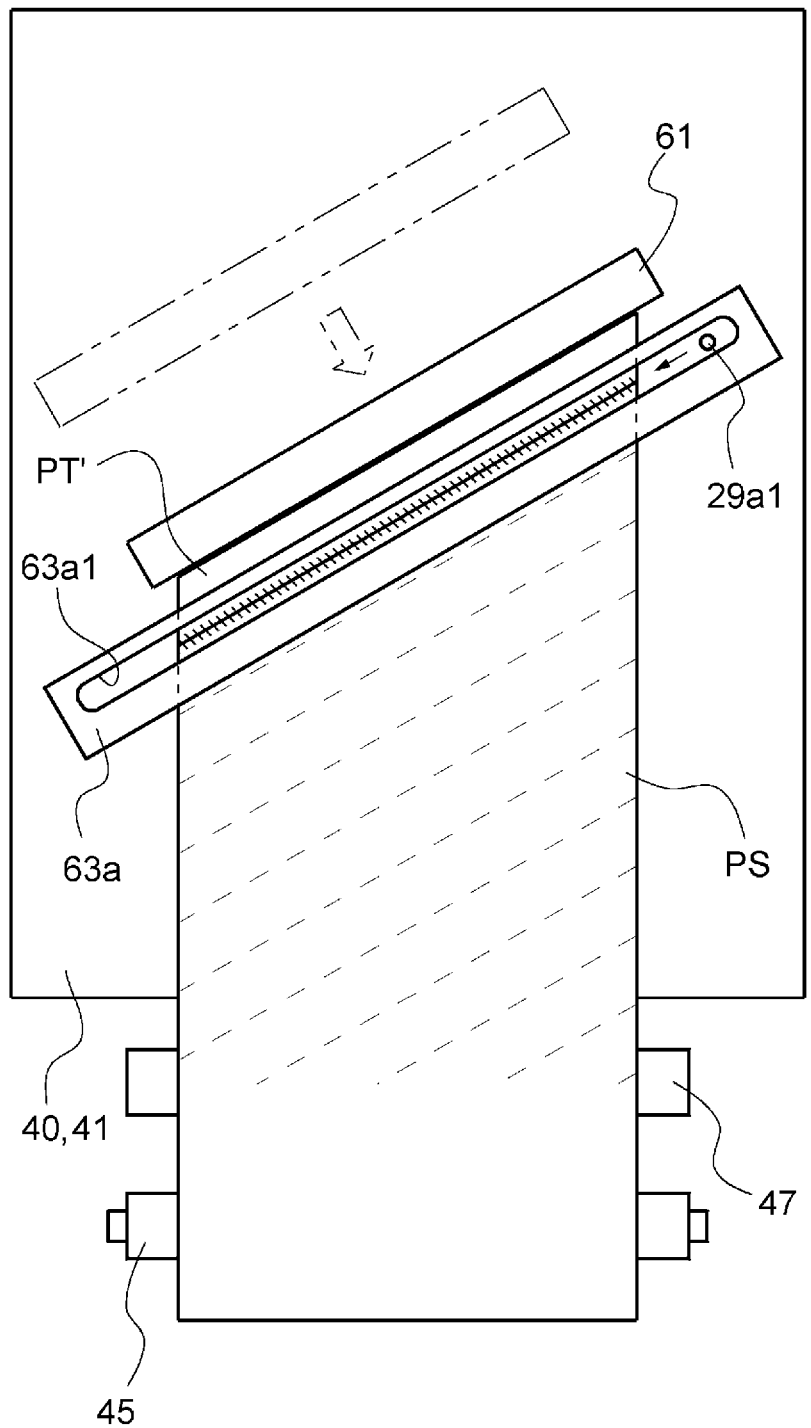
FIG. 3 is a schematic plan view of a section of the machine illustrated in FIG. 1 in which the manufacturing method according to the present invention is carried out.

In addition, as illustrated in FIG. 3, the retaining plate 63a has a through hole 63a1 that extends through the retaining plate 63a in the thickness direction and that is elongated in the long-side direction of the retaining plate 63a. The retaining plate 63a is shaped such that a narrow portion and a wide portion are connected to each other at both ends thereof. The narrow portion is used to maintain the position of the prepreg tape piece PT' that has been placed, and the wide portion is used to maintain the position of the prepreg sheet PS. The through hole 63a1 formed in the retaining plate 63a is large enough to allow a welding head included in the above-described welding mechanism 29 to pass therethrough.

The positioning mechanism including the abutting mechanism and the position maintaining mechanism additionally includes a mechanism for positioning the prepreg tape piece PT' relative to the prepreg sheet PS in the width direction as appropriate.

The welding mechanism 29 is mounted in the supply head 20 as described above, and includes a welder 29a for welding the prepreg tape piece PT' to the prepreg sheet PS. The welder 29a is, for example, a heat welder that applies heat generated by a heater mounted therein to an object through a welding head 29a1. The welder used for welding in the present invention is not limited to the above-described heat welder, and may instead be, for example, an infrared welder, an ultrasonic welder, or a laser welder.

Similar to the placement guide 27a included in the placement mechanism 27, the welder 29a included in the welding mechanism 29 is also supported by a ball screw mechanism. More specifically, the welding mechanism 29 includes a ball screw mechanism including a driving motor 29b, a screw shaft 29c coupled with an output shaft of the driving motor 29b, and a nut 29d screwed on the screw shaft 29c. The welder 29a is supported by the nut 29d of the ball screw mechanism with a bracket 29e provided therebetween. The welding mechanism 29 also includes a guide (not illustrated) that prevents the nut 29d and the bracket 29e from rotating together with the screw shaft 29c and guides the movement of the bracket 29e and the welder 29a in the top-bottom direction. Thus, the welding mechanism 29 is structured such that the driving motor 29b rotates the screw shaft 29c to move the nut 29d and the bracket 29e upward or downward depending on the rotation direction of the screw shaft 29c, thereby moving the welder 29a in the top-bottom direction.

The driving motor 29b of the welding mechanism 29 is controlled so that the welding head 29a1 moves in the top-bottom direction between two positions: a welding position, at which the welding head 29a1 is located when welding is performed as described above and which is close to the above-described placement surface of the table 40, and a retracted position, at which the welding head 29a1 is spaced from and above the placement surface of the table 40. In the above-described placement step, the welding head 29a1 of the welding mechanism 29 is at the retracted position.

A method for manufacturing a prepreg sheet PS as an elongated sheet-shaped reinforcing fiber base material by using the base-material forming machine having the above-described structure will now be described.

First, the base-material forming machine performs the placement step of placing the (subsequent) prepreg tape piece PT' next to and behind the prepreg sheet PS formed of the previously placed (previous) prepreg tape pieces PT' on the table 40 so that the (subsequent) prepreg tape piece PT' extends in a direction of the rear edge of the prepreg sheet PS, that is, in a direction at an angle of 30° with respect to the width direction of the prepreg sheet PS. As described above, the orientation direction of the reinforcing fibers (carbon fibers) contained in the prepreg tape piece PT' is the same as the longitudinal direction of the prepreg tape piece PT'. In the placement step, the prepreg tape piece PT' is placed so as to be at an angle of 30° with respect to the width direction of the prepreg sheet PS. Therefore, by placing the prepreg tape piece PT' in the above-described manner, the orientation direction of the reinforcing fibers (carbon fibers) is at an angle of 30° with respect to the width direction of the prepreg sheet PS.

After the prepreg tape piece PT' has been placed in the above-described manner in the placement step, the abutting mechanism of the positioning mechanism is driven. More specifically, the pressing plate 61 included in the abutting mechanism is driven so as to move toward the prepreg tape piece PT' along the table 40. Accordingly, the prepreg tape piece PT' placed on the table 40 is pushed toward the prepreg sheet PS by the pressing plate 61 and abutted against the rear edge of the prepreg sheet PS, so that the prepreg tape piece PT' adjoins the prepreg sheet PS without a gap therebetween.

The step of abutting the prepreg tape piece PT' against the rear edge of the prepreg sheet PS (abutting step) is a step for eliminating the gap between the prepreg tape piece PT' and the rear edge of the prepreg sheet PS. When the prepreg tape piece PT' is placed without leaving a gap between the prepreg tape piece PT' and the rear edge of the prepreg sheet PS in the placement step, and when the table 40, for example, is configured to maintain the state in which there is no gap (when the prepreg tape piece PT' does not easily move), the abutting step can be omitted. Therefore, in such a case, the abutting mechanism included in the positioning mechanism can also be omitted.

The position maintaining mechanism 63 included in the positioning mechanism is driven in the state in which the prepreg tape piece PT' adjoins the prepreg sheet PS without a gap therebetween as described above. More specifically, first, the leg blocks 63b of the position maintaining mechanism 63 are driven so as to move rearward. The leg blocks 63b are moved while the angle of the support beam 63c and the retaining plate 63a with respect to the width direction (30°) is maintained. The movement of the leg blocks 63b is stopped when the through hole 63a1 formed in the retaining plate 63a reaches a position above the adjoining portions of the prepreg sheet PS and the prepreg tape piece PT' (the rear edge of the prepreg sheet PS and the edge of the prepreg tape piece PT' abutted against the rear edge of the prepreg sheet PS) in the front-rear direction. Accordingly, in plan view, the adjoining portions are located at the center of the through hole 63a1 in the retaining plate 63a in the front-rear direction. Also, the narrow portion is located above the prepreg tape piece PT', and the wide portion is located above the prepreg sheet PS.

Next, the retaining plate 63a of the position maintaining mechanism 63 is moved downward (toward the prepreg sheet PS and the prepreg tape piece PT') while the retaining plate 63a is arranged in the above-described manner. Thus, the retaining plate 63a of the position maintaining mechanism 63 presses the prepreg sheet PS against the table 40 with the wide portion at a location near the rear edge of the prepreg sheet PS, and presses the prepreg tape piece PT' against the table 40 with the narrow portion. As a result, the position of the prepreg tape piece PT' relative to the prepreg sheet PS is maintained while an edge of the prepreg tape piece PT' is abutted against the rear edge of the prepreg sheet PS. When the step of maintaining the position of the prepreg tape piece PT' (position maintaining step) is completed, the abutting mechanism is driven so that the pressing plate 61 moves away from the prepreg tape piece PT'.

Then, a welding step of welding the prepreg tape piece PT' to the prepreg sheet PS is performed by the welding mechanism 29 mounted in the supply head 20. In this example, the welding step is performed by moving the supply head 20 along the movement path for the placement step in a direction opposite to the movement direction for the placement step. More specifically, in this example, the placement step is performed by moving the supply head 20 in one direction (for example, in a direction from left to right (upper right) in FIG. 3), and the supply head 20 is returned to the start position of the placement step by moving the supply head 20 along the movement path for the placement step in the opposite direction (for example, from right to left (lower left) in FIG. 3). The welding step is performed while the supply head 20 is being returned.

In the welding step, the supply head 20 is set so that the placement guide 27a, which has been located at the operation position in the placement step, is at the retracted position, and the welding head 29a1, which has been located at the retracted position in the placement step, is at the welding position (FIG. 2B). In this state, the welding head 29a1 of the welding mechanism 29 (welder 29a) is inserted through the through hole 63a1 of the retaining plate 63a that has been set to press the prepreg sheet PS and the prepreg tape piece PT' in the above-described position maintaining step.

When the supply head 20 in the above-described state is moved in the above-described manner, the welder 29a of the welding mechanism 29 moves along the rear edge (edge at the rear side) of the prepreg sheet PS and the edge of the prepreg tape piece PT' that are abutted against each other, that is, along the adjoining edges of the prepreg sheet PS and the prepreg tape piece PT'. Accordingly, the welding head 29a1 of the welder 29a is moved so as to follow the edge portions including the adjoining edges of the prepreg sheet PS and the prepreg tape piece PT' and the regions around the adjoining edges (portions indicated by the slanted lines in FIG. 3).

Accordingly, the adjoining edge portion of the (previous) prepreg tape piece PT' that defines the rear end portion of the prepreg sheet PS and the adjoining edge portion of the (subsequent) prepreg tape piece PT' are heated so that the thermoplastic resin contained in the prepreg tape pieces PT' is melted at the adjoining edge portions. As a result, the thermoplastic resin contained in the edge portion of the prepreg sheet PS (previous prepreg tape piece PT') and the thermoplastic resin contained in the edge portion of the (subsequent) prepreg tape piece PT' are joined together. When the welding head 29a1 moves away, the edge portions are no longer heated so that the temperature thereof decreases. Accordingly, the melted and joined thermoplastic resin is cured, and the (subsequent) prepreg tape piece PT' that has been newly placed in the placement step is joined to the prepreg sheet PS and integrated with the prepreg sheet PS as a result. In other words, the prepreg tape piece PT' is joined to the prepreg sheet PS so that the prepreg sheet PS receives an additional portion thereof.

Thus, according to the manufacturing method of this example based on the present invention, unlike the manufacturing method of the related art in which a sheet-shaped support member, such as a film, is used and in which reinforcing fiber material pieces are placed on and welded to the support member, the prepreg tape pieces PT', which serve as reinforcing fiber material pieces and which are successively arranged next to each other in the front-rear direction on the table 40, are formed in the shape of a sheet by joining the adjoining edges thereof by heat welding. Thus, a prepreg sheet PS formed of the prepreg tape pieces PT' can be obtained as a sheet-shaped reinforcing fiber base material. In other words, according to the manufacturing method, a reinforcing fiber base material (prepreg sheet PS) which includes only the reinforcing fiber material pieces (prepreg tape pieces PT') and does not include the support member as in the related art can be obtained.

After the welding step is completed, the position maintaining mechanism 63 is driven to move the retaining plate 63a upward so that the prepreg sheet PS is released from the state in which the position thereof is maintained by the retaining plate 63a. Then, the placement step is performed again to place a new prepreg tape piece PT' behind the prepreg sheet PS formed in the above-described manner. The placement step and the following steps are repeated so that the prepreg sheet PS is gradually formed (manufactured) in the shape of an elongated sheet. The orientation direction of the reinforcing fibers contained in the prepreg sheet PS manufactured in the above-described manner is at an angle of 30° with respect to the width direction of the prepreg sheet PS. Thus, the prepreg sheet PS is formed so that the orientation direction of the reinforcing fibers contained therein is at an angle with respect to the longitudinal direction and the width direction thereof.

Then, the prepreg sheet PS formed in the above-described manner is wound around the winding shaft 45 of the take-up mechanism as described above, and is moved forward (in the feeding direction) on the table 40 as the prepreg sheet PS is wound.

The driving operation of the winding shaft 45 of the take-up mechanism is performed between the welding step and the placement step that are repeated as described above, and is performed intermittently in accordance with the welding step. More specifically, every time the welding step is completed, the winding shaft 45 is driven once so as to wind the prepreg sheet PS so that the prepreg sheet PS (the rear edge) is moved forward by an amount corresponding to the width of the prepreg tape PT (prepreg tape piece PT'). The winding shaft 45 may instead be driven once every time the cycle from the placement step to the welding step for forming the prepreg sheet PS is performed n times (n≥2). In such a case, every time the welding step is completed for the $n^{th}$ time, the prepreg sheet PS is wound so that the prepreg sheet PS (the rear edge) is moved forward by an amount corresponding to n times the width of the prepreg tape PT (prepreg tape piece PT'). In the former case, the placement step is performed at the same position on the table 40 every time. In the latter case, the placement step is performed so that the position at which the prepreg tape piece PT' is placed is gradually moved rearward while the cycle of forming the prepreg sheet PS is repeated n times.

In the above-described example, the prepreg sheet PS, which is a reinforcing fiber base material manufactured by the manufacturing method based on the present invention, is such that the orientation direction of the reinforcing fibers contained therein is at an angle with respect to both the longitudinal direction and the width direction of the prepreg sheet PS, and the angle is 30° with respect to the width direction (that is, 60° with respect to the longitudinal direction). However, this is merely an example, and the orientation direction (angle) may be set otherwise as appropriate depending on the reinforcing fiber base material to be manufactured. In other words, the orientation direction (angle) of the reinforcing fibers in the reinforcing fiber base material manufactured by the manufacturing method of the present invention is not limited to the above-mentioned angle, and may instead be set to any other angle, such as 60° or 45° with respect to the width direction.

In addition, the reinforcing fiber base material is not limited to those in which the orientation direction (angle) of the reinforcing fibers is at an angle with respect to both the longitudinal direction and the width direction of the reinforcing fiber base material as described above, and the orientation direction may be parallel to the width direction (at an angle of 90° with respect to the longitudinal direction). In this case, the supply head 20 is moved in a direction parallel to the width direction in the above-described placement step.

As described above, the reinforcing fiber base material manufactured by the manufacturing method of the present invention is set so that the orientation direction of the reinforcing fibers contained therein is at an angle with respect to at least the longitudinal direction of the reinforcing fiber base material. The manufacturing method of the present invention may be applied to manufacture reinforcing fiber base materials in which the orientation direction of the reinforcing fibers is set to various angles.

The present invention is not limited to the above-described embodiment (hereinafter referred to as "example"), and embodiments (modifications) described below are also possible.

(1) The above-described example is an embodiment in which the manufacturing method according to the present invention is automatically implemented by a base-material forming machine. The base-material forming machine is a machine based on an automatic lay-up machine, that is, a machine in which the placement step is performed by moving the supply head 20, in which the raw-material roller 21 obtained by winding the reinforcing fiber material is mounted, above the table 40. However, the manufacturing method according to the present invention may also be automatically implemented by a machine other than the machine according to the above-described example. For example, a base-material forming machine illustrated in FIG. 4 may instead be used. This base-material forming machine will now be described in detail.

A table 80, on which a welding step and other steps are performed, is structured such that a portion thereof is movable in the width direction. More specifically, the table 80 includes a table base 81, which serves as a base of the table 80, and a movable board 83 that is movable in the width direction in a guide groove 81a formed in the table base 81. The table base 81 includes a main body 81b on which the welding step and other steps are performed and a guide portion 81c that is integrated with the main body 81b so as to extend in the width direction at the position of the guide groove 81a. The guide groove 81a in the table base 81 extends in the width direction over the main body 81b and the guide portion 81c. Accordingly, the movable board 83 is movable between the main body 81b and the guide portion 81c in the guide groove 81a. The table 80 includes a driving mechanism (not illustrated) disposed between the table base 81 (guide groove 81a) and the movable board 83. The movable board 83 is driven by the driving mechanism so as to move between the main body 81b and the guide portion 81c of the table base 81.

A support base 71 is disposed next to the guide portion 81c of the table base 81 of the table 80 in the width direction. A raw-material roller 21 is supported above the support base 71 by a support mechanism (not illustrated) including a driving mechanism that rotates the raw-material roller 21. Similar to the raw-material roller 21 mounted in the supply head 20 of the base-material forming machine according to the above-described example, this raw-material roller 21 is also formed by winding an elongated prepreg tape PT. The prepreg tape PT is made of a thermoplastic UD prepreg material as in the above-described example. The base-material forming machine manufactures a prepreg sheet PS in which the orientation direction of the reinforcing fibers (carbon fibers) is at an angle of 90° with respect to the longitudinal direction of the prepreg sheet PS.

The support base 71, above which the raw-material roller 21 is supported, includes a receiving pad 71a. The receiving pad 71a extends to a region above an end portion of the guide portion 81c in the width direction. The prepreg tape PT pulled from the raw-material roller 21 is guided to the table 80 (guide portion 81c) through the region above the receiving pad 71a. A cutting device including a cutter (neither is illustrated) is provided above the receiving pad 71a. The prepreg tape PT pulled from the raw-material roller 21 is cut by cooperation of the cutter included in the cutting device and the receiving pad 71a.

A take-up mechanism, which takes up the prepreg sheet PS manufactured on the table 80, is disposed in front of the main body 81b of the table base 81 of the table 80. The take-up mechanism has the same structure as that of the take-up mechanism included in the base-material forming machine according to the above-described example, and includes a winding shaft 45 and a guide roller 47.

A pulling mechanism 73 that is movable in the width direction (direction in which the guide portion 81c extends) is disposed above the guide portion 81c of the table base 81 of the table 80. The pulling mechanism 73 includes a holding head 73a capable of holding the prepreg tape PT by, for example, air suction. The pulling mechanism 73 is moved above the guide portion 81c in the width direction by a driving mechanism (not illustrated) mounted therein.

An abutting mechanism that corresponds to the abutting mechanism included in the base-material forming machine according to the above-described example and that includes a pressing plate 85 is disposed on the main body 81b of the table base 81 of the table 80. The abutting mechanism is configured such that the pressing plate 85 is driven by a driving device 85a (not illustrated in detail) to move in the front-rear direction on the table 80. In the abutting mechanism, the driving device 85a is disposed on the top surface of a portion of the main body 81b of the table base 81 behind the guide groove 81a (rear portion). The pressing plate 85 is also disposed on the rear portion of the main body 81b at the initial position thereof. The driving device 85a is capable of moving the pressing plate 85 forward in the front-rear direction beyond the guide groove 81a.

The height (dimension in the top-bottom direction) of the movable board 83 of the table 80 is set in accordance with the depth of the guide groove 81a so that the top surface of the movable board 83 and the top surface of the main body 81b are at the same height. Thus, the table 80 is configured such that when the movable board 83 is within the range of the main body 81b in the width direction, the top surface of the movable board 83 and the top surface of the main body 81b are on the same plane in the top-bottom direction. Accordingly, when the movable board 83 of the table 80 is located in front of the abutting mechanism, the pressing plate 85, which is disposed on the rear portion of the main body 81b at the initial position thereof, is movable to a portion of the main body 81b in front of the guide groove 81a (front portion) over the movable board 83.

A pair of guide rails 81d is provided on the top surface of the front portion of the main body 81b of the table base 81 of the table 80. The guide rails 81d extend in the front-rear direction and are separated from each other in the width direction. A welding mechanism 87 (not illustrated in detail) is disposed above the front portion of the main body 81b. The welding mechanism 87 is movable in the front-rear direction while being guided by the guide rails 81d.

The welding mechanism 87 of this example has the function of the position maintaining mechanism included in the base-material forming machine according to the above-described example. More specifically, the welding mechanism 87 includes not only a welding head for welding the prepreg tape piece PT' to the prepreg sheet PS but also a retaining plate for pressing the prepreg sheet PS and the prepreg tape piece PT' against the table 80 (main body 81b) to maintain the position of the prepreg tape piece PT' relative to the prepreg sheet PS. In addition, the welding mechanism 87 also includes driving means for moving the welding head and the retaining plate in the top-bottom direction.

In this example, the welding head of the welding mechanism 87 extends over the entire width of the prepreg sheet PS in the width direction, and is capable of simultaneously heating the adjoining portions of the prepreg sheet PS and the prepreg tape piece PT' over the entire width thereof in the width direction. However, the welding head may instead be configured to move in the width direction and heat the adjoining portions of the prepreg sheet PS and the prepreg tape piece PT' from one end thereof in the width direction, as in the above-described example. The position maintaining mechanism included in the welding mechanism 87 has a structure similar to that in the above-described example. However, the position maintaining mechanism may instead be configured so that a retaining plate for pressing the prepreg sheet PS and a retaining plate for pressing the prepreg tape piece PT' are provided as separate plates and are driven by their respective driving means so as to move in the top-bottom direction.

In the above-described base-material forming machine illustrated in FIG. 4, first, the movable board 83 is disposed on the guide portion 81c of the table base 81 of the table 80, and the pulling mechanism 73 is disposed above the receiving pad 71a of the support base 71. Then, in this state, the pulling mechanism 73 causes the holding head 73a to hold a leading end portion of the prepreg tape PT on the receiving pad 71a by suction, and moves along the guide portion 81c toward the main body 81b, so that the prepreg tape PT is pulled from the raw-material roller 21. Then, when the length of a portion of the prepreg tape PT that is pulled from the raw-material roller 21 reaches a predetermined length (length equal to the width of the prepreg sheet PS), the movement of the pulling mechanism 73 is temporarily stopped and the prepreg tape PT is cut by the cutting device on the receiving pad 71a. Accordingly, the prepreg tape piece PT' is cut off from the prepreg tape PT connected to the raw-material roller 21.

After the prepreg tape piece PT' is cut off, the pulling mechanism 73 starts to move again, and stops when the pulling mechanism 73 reaches a predetermined position above the movable board 83, which is disposed on the guide portion 81c as described above. Then, the holding head 73a of the pulling mechanism 73 is driven so as to move downward so that the prepreg tape piece PT' held by the holding head 73a is laid on the movable board 83, and the prepreg tape piece PT' is released from the holding head 73a. Thus, the prepreg tape piece PT' is placed on the movable board 83 (table 80) (placement step).

Then, the movable board 83 is driven so as to move toward the main body 81b of the table base 81 to a position in front of the abutting mechanism, which is disposed on the rear portion of the main body 81b. In this state, the abutting mechanism is driven so that the pressing plate 85 moves forward. Accordingly, the prepreg tape piece PT' on the movable board 83 is pushed toward the front portion of the main body 81b by the pressing plate 85 and abutted against the rear edge of the prepreg sheet PS on the front portion of the main body 81b (abutting step).

In the state in which the prepreg sheet PS and the prepreg tape piece PT' are abutted against each other, the welding mechanism 87 is driven so that the position maintaining mechanism maintains the position of the prepreg tape piece PT' relative to the prepreg sheet PS as in the above-described example (position maintaining step), and the welding head performs the welding step. As a result, the prepreg tape piece PT' is joined to the prepreg sheet PS and integrated with the prepreg sheet PS. The prepreg sheet PS that has been formed (manufactured) in the above-described manner contains reinforcing fibers (carbon fibers) oriented in a direction at an angle of 90° with respect to the longitudinal direction.

In the base-material forming machine illustrated in FIG. 4, the movable board included in the table 80 may instead be disc-shaped and configured to be rotatable by a predetermined angle while being disposed in front of the abutting mechanism, and the abutting mechanism and the welding mechanism may be configured to be capable of operating in accordance with the predetermined angle. In such a case, similar to the above-described example, a prepreg sheet PS in which the orientation direction of the reinforcing fibers is at an angle with respect to both the longitudinal direction and the width direction of the prepreg sheet PS can be formed.

(2) In the above-described example, the prepreg sheet PS and the prepreg tape piece PT' are pressed from above by the retaining plate to maintain the positions thereof on the table (position of the prepreg tape piece PT' relative to the prepreg sheet PS) in the above-described position maintaining step. However, the structure for maintaining the positions is not limited to those including the retaining plate. For example, the structure for maintaining the positions may instead be obtained by forming holes in the table so that the holes open in the top surface of the table and are connected to the outside. The prepreg sheet PS and the prepreg tape piece PT' on the table may be held by suction (vacuum suction) by sucking air through the holes.

In the structure in which the prepreg sheet PS and the prepreg tape piece PT' are held on the table by suction as described above, when the placement step may be performed so that the prepreg tape piece PT' extends along the rear edge of the prepreg sheet PS as in the above-described example, and when the prepreg tape piece PT' can be placed without leaving a gap between the prepreg tape piece PT' and the rear edge of the prepreg sheet PS in the front-rear direction of the table, the abutting step of abutting the above-described prepreg tape piece PT' against the rear edge of the prepreg sheet PS can be omitted.

In the above-described base-material forming machine illustrated in FIG. 4, the movable board 83 that moves with the prepreg tape piece PT' placed thereon is preferably configured so that the prepreg tape piece PT' is held by suction in the above-described manner. The prepreg tape piece PT' held on the movable board 83 by suction needs to be released in the abutting step performed by the above-described abutting mechanism.

(3) In the above-described example, the elongated prepreg tape PT is prepared in the form of a raw-material roller (roll body) obtained by winding the prepreg tape PT, and the prepreg tape piece PT' is cut off from the prepreg tape PT pulled from the raw-material roller in the base-material forming machine. In other words, the prepreg tape piece PT', which serves as the reinforcing fiber material piece, is obtained by cutting off a portion of the elongated prepreg tape PT. According to the present invention, even when the reinforcing fiber material piece used to manufacture the reinforcing fiber base material is obtained by cutting the reinforcing fiber material piece off from an elongated (sheet-shaped or tape-shaped) reinforcing fiber material, the reinforcing fiber material piece may be prepared as a reinforcing fiber material piece cut in a predetermined shape (size) in advance before being supplied to the base-material forming machine instead of being cut in the base-material forming machine. In this case, the reinforcing fiber material piece cut in advance is supplied to the base-material forming machine. The reinforcing fiber material piece is not limited to those obtained by cutting an elongated reinforcing fiber material as described above, and may instead be formed as a fiber material piece having a desired shape.

(4) In the above-described example, for example, the prepreg sheet PS, which serves as a reinforcing fiber base material, is automatically manufactured by the above-described base-material forming machine. However, the manufacturing method of the present invention is not limited to an embodiment in which the method is carried out automatically by a base-material forming machine, and also includes an embodiment in which the method is carried out manually by a worker. In other words, the manufacturing method of the present invention may be carried out by a worker by successively placing reinforcing fiber material pieces prepared in advance onto a table (placement step), abutting adjoining edges of the (previous) reinforcing fiber material piece that has been previously placed and the (subsequent) reinforcing fiber material piece that has been placed subsequent thereto against each other, and heat welding the adjoining portions together by using a manually operated welder, such as a soldering iron or a heat sealer, while the state in which the adjoining edges are abutted against each other is maintained.

(5) In the above-described example, the reinforcing fiber material piece used to form the reinforcing fiber base material is a carbon fiber prepreg sheet (tape) material obtained by impregnating carbon fibers, which serve as reinforcing fibers, with a thermoplastic resin, which serves as a matrix resin. However, in the present invention, the reinforcing fiber material piece may instead contain, instead of the above-described carbon fibers, glass fibers, aramid fibers, polyethylene fibers, etc., as reinforcing fibers. The reinforcing fiber material piece is not limited to those formed as prepreg by impregnating the reinforcing fibers with the matrix resin (thermoplastic resin) as described above, and may instead be a so-called semi-preg obtained by applying a sufficient amount of matrix resin to the reinforcing fibers to keep the reinforcing fibers bound together.

The present invention is not limited to any of the above-described embodiments, and various modifications are possible within the scope of the present invention.

What is claimed is:

1. A method for manufacturing a reinforcing fiber base material having a shape of a continuous elongated sheet and used to manufacture a fiber reinforced composite material, the reinforcing fiber base material including reinforcing fibers oriented in a same orientation direction and a thermoplastic resin and being formed so that the orientation direction of the reinforcing fibers is at an angle with respect to a longitudinal direction of the reinforcing fiber base material, the method comprising:

a placement step of placing a sheet-shaped reinforcing fiber material piece, in which the reinforcing fibers are arranged so as to extend in one direction and bound together with the thermoplastic resin, on a table so that the orientation direction of the reinforcing fibers is at an angle with respect to the longitudinal direction, the reinforcing fiber material piece being placed so as to adjoin a rear edge of the reinforcing fiber base material at a rear in a feeding direction that is parallel to the longitudinal direction and that is a direction in which the reinforcing fiber base material that is positioned on the table is fed;

a welding step in which, in a state in which the reinforcing fiber material piece that is a subsequent reinforcing fiber material piece that is placed in the placement step is abutted in the longitudinal direction against the rear edge of the reinforcing fiber base material that is positioned on the table, the rear edge of the reinforcing fiber base material and a front edge of the reinforcing fiber material piece that is the subsequent reinforcing fiber material piece are welded together to cause the reinforcing fiber material piece that is the subsequent reinforcing fiber material piece to be integrated with the reinforcing fiber base material; and a take-up step in which the reinforcing fiber base material is taken up by a take-up mechanism so as to feed the reinforcing fiber base material in the feeding direction when the placement step and the welding step are each performed once or a plurality of times, the take-up mechanism being disposed in front of the table.

* * * * *